United States Patent [19]

Lee

[11] Patent Number: 4,527,999

[45] Date of Patent: Jul. 9, 1985

[54] SEPARATION MEMBRANE AND METHOD OF PREPARING AND USING SAME

[75] Inventor: Cheng H. Lee, Wilmington, Mass.

[73] Assignee: Abcor, Inc., Wilmington, Mass.

[21] Appl. No.: 592,519

[22] Filed: Mar. 23, 1984

[51] Int. Cl.³ .............................................. B01D 53/22
[52] U.S. Cl. .......................................... 55/16; 55/68; 55/158; 210/654; 264/342 R; 528/353
[58] Field of Search .............................. 55/16, 68, 158; 210/500.2, 654; 264/342 R, 344; 427/245, 246; 528/353

[56] References Cited

U.S. PATENT DOCUMENTS

| | | | |
|---|---|---|---|
| Re. 27,319 | 3/1972 | Manjikian et al. | 210/500.2 X |
| 3,412,184 | 11/1968 | Sharples et al. | 210/500.2 X |
| 3,415,038 | 12/1968 | Merten et al. | 55/16 |
| 3,423,491 | 1/1969 | McLain et al. | 210/500.2 X |
| 3,497,072 | 2/1970 | Cannon | 210/500.2 |
| 3,580,841 | 5/1971 | Cadotte et al. | 210/500.2 X |
| 3,592,672 | 7/1971 | Rowley et al. | 210/500.2 X |
| 3,709,774 | 1/1973 | Kimura | 210/500.2 X |
| 3,842,515 | 10/1974 | MacDonald et al. | 34/9 |
| 3,852,388 | 12/1974 | Kimura | 55/16 X |
| 3,884,801 | 5/1975 | Kesting | 210/500.2 X |
| 4,029,582 | 6/1977 | Ishii et al. | 55/158 X |
| 4,068,387 | 1/1978 | Manos | 34/9 |
| 4,080,743 | 3/1978 | Manos | 34/9 |
| 4,080,744 | 3/1978 | Manos | 34/9 |
| 4,130,403 | 12/1978 | Cooley et al. | 55/16 |
| 4,132,824 | 1/1979 | Kimura et al. | 55/158 X |
| 4,134,742 | 1/1979 | Schell | 55/16 |
| 4,172,885 | 10/1979 | Perry | 423/359 |
| 4,180,552 | 12/1979 | Graham et al. | 423/359 |
| 4,180,553 | 12/1979 | Null et al. | 423/359 |
| 4,214,020 | 7/1980 | Ward et al. | 427/296 |
| 4,230,463 | 10/1980 | Henis et al. | 55/16 |
| 4,276,173 | 6/1981 | Kell et al. | 210/500.2 |
| 4,286,015 | 8/1981 | Yoshida et al. | 210/500.2 X |
| 4,351,860 | 9/1982 | Yoshida et al. | 210/500.2 X |
| 4,364,759 | 12/1982 | Brooks et al. | 210/500.2 X |
| 4,448,687 | 5/1984 | Wang | 210/500.2 |
| 4,486,376 | 12/1984 | Makino et al. | 264/342 R |

Primary Examiner—Robert H. Spitzer
Attorney, Agent, or Firm—Richard P. Crowley

[57] ABSTRACT

A differential pore-collapsed separation membrane particularly useful as a gas-separation membrane and a method of preparing such differential pore-collapsed membrane, which method comprises treating an asymmetric membrane, while under one-sided constraint, with a treating solution comprising a volatile nonsolvent and a swelling agent and/or a solvent, and drying the treated membrane, to provide for the controlled, differential pore collapse of the small pores of the top skin of the membrane to a smaller pore-size distribution in the membrane generally less than about 10 Angstroms.

40 Claims, 2 Drawing Figures (PRIOR ART)
FIG. 1

FIG. 2

SEPARATION MEMBRANE AND METHOD OF PREPARING AND USING SAME

BACKGROUND OF THE INVENTION

Gas-separation membranes are known and are typically employed for the separation of one or more components of a gaseous mixture. In general, gas-separation membranes may be employed usefully, for example, in the oxygen enrichment of air, for the removal of acid-gas components from natural, synthetic or refinery gases and for the separation and recovery of various gases, including hydrogen and carbon dioxide. Asymmetric, dry, cellulose acetate or cellulose ester-type membranes have been employed which have been suggested for use in the separation of helium from various gas mixtures, hydrogen from carbon monoxide and oxygen from nitrogen, through employing a dry cellulose-acetate membrane which comprises a thin, selected permeable layer and a relatively thick, integral porous layer (see, for example, U.S. Pat. No. 3,415,038, issued Dec. 10, 1968).

Cast separation membranes, typically useful for gas separation in spiral-module-type gas separators, have been prepared by casting a cellulose-acetate solution onto a shrinkable fabric and then gelling, leaching, annealing and drying by solvent exchange the cast film, to provide a fabric-supported, dry, cellulose ester-type membrane in which the shrinking of the fabric in the membrane is controlled, to avoid curling, wrinkling or cracking of the membrane in flat form or when spirally wound (see, for example, U.S. Pat. No. 4,134,742, issued Jan. 16, 1979). Asymmetric-type, cellulose-acetate membranes; that is, having a thin permeation layer and a thicker, relatively underlying porous layer, have been prepared and used typically for various ultrafiltration and reverse-osmosis processes, and such processes have been altered to provide for cellulose-acetate membranes particularly useful for gas-separation processes.

Generally, the preparation of a cellulose-acetate membrane comprises providing a casting solution of a solvent and cellulose acetate, casting the solution to form a membrane film, typically on a support, evaporating a portion of the solvent and then immersing the cast membrane in water, to form a wet, swollen, membrane-film structure and then drying and heat-annealing the swollen membrane, to reduce the porosity and to form a tight membrane structure suitable for reverse-osmosis processes (see U.S. Pat. No. 3,497,072, issued Feb. 24, 1970). One method for drying a water-wet cellulose-ester membrane comprises immersing the membrane in a water-soluble alcohol, such as isopropanol, to replace substantially all of the water in the membrane with the more volatile alcohol, and then immersing the alcohol-wet membrane in a nonpolar alcohol-soluble, volatile organic liquid, so as to replace the alcohol with the organic liquid, and then, thereafter, drying the organic liquid-wet membrane, to produce a dry cellulose-acetate membrane suitable for use in gas separation (see U.S. Pat. No. 3,842,515, issued Oct. 22, 1974). Another process for drying a water-wet membrane, particularly useful for gas membrane separation, comprises, firstly, contacting the water-wet membrane with a solution containing a major amount of one organic solvent and a minor portion of another organic solvent which is substantially miscible with the water, and, after the water has been removed substantially from the membrane, then evaporating the remaining replacement solution, to obtain a dry membrane free of water and the replacement solution (see, for example, U.S. Pat. Nos. 4,080,743 and 4,080,744, both issued Mar. 28, 1978, and U.S. Pat. No. 4,068,387, issued Jan. 17, 1978).

Dry, cellulose-ester, gas-separation membranes may be employed for a number of gas separations, such as, for example, for the removal of hydrogen sulfide and carbon dioxide from a natural gas stream, or to produce a carbon-dioxide-rich stream (see, for example, U.S. Pat. No. 4,130,403, issued Dec. 19, 1978). Thus, generally while cellulose-ester-type membranes may be employed for ultrafiltration and reverse-osmosis processes, in their use for gas separations, they typically must be dried by a special solvent-exchange process, to produce an effective gas-separation membrane.

Gas-separation membranes may be employed in various forms, such as in hollow-fiber, tubular, flat-sheet and spiral-module forms. Generally, spiral modules are mechanically simpler, easier to manufacture and are more effectively used in a membrane area, but also may be more prone to leaks and adhesive problems, but are generally preferred when the feed gas, and not the permeate gas, is the desirable product. Often, membranes employ the cellulose-ester or other polymer-type membranes on a support, such as a fabric support, and then are spiral-wound and are placed within a housing. Gas-separation membranes are also usefully employed in hollow fibers which are assembled into compact bundles, and which assembly provides for a large membrane area for gas transport. Such hollow-fiber bundles are typically assembled into a pressure vessel to form gas separators, and may be utilized into a skid-mounting system for easy field installation. The size of the housing for such hollow-fiber separators may vary by diameter and length and may be arranged in various configurations, depending on the gas to be separated and the number of separations required in the process. Such hollow-fiber gas separators comprise a pressure-type steel housing which contains a plurality of bundles and bundles of hollow fibers of the gas-separation membrane therein, with a fiber bundle plug at each end, and an inlet to introduce a feed stream of mixed gases to be separated, a gas outlet for the nonpermeate gaseous mixture and a permeate gas outlet to remove the gas which has permeated to the center within the hollow fibers of the bundles.

Hollow-fiber-type gas permeates are particularly useful for recovering hydrogen for ammonia purge gas, as well as for other gas-separation techniques (for example, see U.S. Pat. No. 4,172,885, issued Oct. 30, 1979, U.S. Pat. No. 4,180,552, issued Dec. 25, 1979, and U.S. Pat. No. 4,180,553, issued Dec. 25, 1979). The gas separators may be placed in a series of various permeate stages. Hollow fibers employed in the gas separators may be treated, such as by coating bundles of the hollow fibers (see U.S. Pat. No. 4,214,020, issued July 22, 1980).

A multiple-component-type membrane may be employed as a gas-separation membrane with a variety of gaseous mixtures (see, for example, U.S. Pat. No. 4,230,463, issued Oct. 28, 1980). This patent discloses a multicomponent gas-separation membrane comprising a porous, asymmetric substrate typically in hollow-fiber form made, for example, from a polymer, such as polysulfone, which has good, intrinsic, gas-separation properties, and which multicomponent membrane comprises a coating which has a high permeability for the gases, such as, for example, a coating of a silicone polymer. The polysulfone substrate is an effective separating barrier, as well as a physical support, while the silicone polymer material, which covers the polysulfone substrate, fills in the pores of the polysulfone membrane which constitutes imperfection in the polysulfone substrate. The added resistance to flow of the gas in the pores filled with the polysilicone polymer allows permeation in the much larger nonporous surface to predominate.

In the multicomponent membrane, it is important to select proper relative permeabilities for the coating and the substrate, since, if the permeability for the polysilicone polymer coating is much higher than the substrate, then too much of the gas mixture will go through the coating-filled pores. If the permeabilities of both the substrate and the coating are comparatively low, the resistance to flow of the gas will hamper productivity. Thus, the ratio of the coating permeability to that for the substrate is important, and the pores of the multicomponent membrane must be plugged with a material which exhibits a high permeability of the selected gas for the gaseous mixture to be separated by the membrane.

Such multicomponent membranes have been suggested for use to recover hydrogen from ammonia purge gas, to recover hydrogen from refinery desulfurization purge gas, to adjust the ratio of hydrogen to carbon monoxide from methanol and acetic-acid production and generally for the separation of fast-type gases from slow-type gases; that is, fast gases, such as hydrogen, helium, carbon dioxide, hydrogen sulfide and water, from slow gases, such as oxygen, methane, carbon monoxide, nitrogen and $C_2$-$C_6$ aliphatic hydrocarbons.

In general, there are limitations both on the use of cellulose-ester-type dry, gas-separation membranes and multicomponent gas-separation membranes. Cellulose-ester-type membranes are variable in gas permeability and require a careful drying, to define the gas-separation properties. Cellulose acetate, either alone or with other cellulose-ester membranes, are subject to change under various process conditions, such as temperature, pH and other adverse conditions. The multicomponent gas-separation membranes, while useful, may be affected by impurities, and the membrane and the coating must be selected and adjusted for each specific gas separation. In addition, the allowable operating temperature range and the chemical resistance of the multicomponent membranes generally are limited by both the substrate and the coating material.

The conversion of cellulose-acetate-type membranes to gas-separation membranes, comprising separate casting, gelating, leaching and annealing and then the separate solvent-exchange drying, to provide the gas-separation membrane, often produces membranes of varying quality and with too great a variance in the gas-separation factor. Generally, the casting solution and the gelation conditions basically determine the intrinsic, high-flux, open-cell, asymmetric porous membrane, while the heat-annealing step tends to tighten the membrane skin, to produce the tight separation layer for reverse-osmosis membranes. Therefore, the problem arises of too great a variance with the separating factor, and a less asymmetric densification of the membrane tends to reduce permeation rate, while there are intrinsic problems for cellulose acetate regarding stability and aging affects in use. The multicomponent gas-separation membrane requires the selection of a particularly coated material and the balance of the intrinsic separation factors between the membrane and the coating material and the plugging of all of the membrane pores.

Thus, it is desirable to provide for an improved separation membrane and a method for making such a gas-separation membrane and a process of using such a membrane in the separation of fluids, particularly gases.

SUMMARY OF THE INVENTION

The invention concerns a separation membrane having a collapsed pore size, a method of collapsing differentially the pores in the skin layer of the membrane, and to the use of the membrane in the separation of fluids. In particular, the invention concerns a gas-separation membrane having a controlled, collapsed pore size, a method of collapsing and controlling differentially the pores in the membrane, to create a separation layer of the membrane of controlled pore size, and to a method of employing the membrane in the separation of gases.

The present invention relates to a process for preparing a unique asymmetric separation membrane of controlled and selected pore size in the top thin-skin layer of the membrane, which membrane is suitable for use as a separation membrane, and particularly suitable for use as a gas-separation membrane. The process for making the asymmetric, open-cell, porous membranes of the invention comprises the conversion of a dry, porous separation membrane into a membrane of selected pore skin structure, by a chemical differential pore-collapsing technique, to produce a membrane particularly suitable as a gas or reverse-osmosis membrane. The process comprises the differential collapsing of the small pores of the top skin layer of the dry asymmetric membrane to a desired smaller pore size, by posttreating the dry membrane, rather than by heat-annealing of the wet asymmetric membrane, with a posttreatment solution through a technique of generally chemical annealing. The posttreatment solution typically comprises a volatile nonsolvent for the particular polymer of the membrane and a less volatile swelling agent or solvent for the polymer of the membrane.

After the solution posttreatment, the treated membrane is dried, while the one side of the membrane opposite the skin layer is constrained. In the drying step, the one-sided, constrained, treated dry membrane permits the preferential removal of the nonsolvent, so as to cause differential pore collapse of the small pores of the top skin layer of the membrane, by the concentrated, residual action of the less volatile swelling agent or solvent in the skin layer. The process and membranes of the invention avoid the difficulties associated with current commercial processes relating to the conversion of dry cellulose-acetate, reverse-osmosis membranes to gas-separation membranes, by the use of a solvent-exchange process and by the heat-annealing of the membrane. In effect, the invention provides for a chemical annealing, rather than a heat-annealing, of the membranes, although heat-annealing may be employed, if desired, but is optional, rather than essential, as in past processes. Further, the process of the invention differs significantly from the current commercial process of multicomponent membranes, wherein a porous substrate is converted to a gas-separation membrane by coating and plugging specifically the holes of the porous membrane with a particular selected material, such as a silicone polymer.

The process of differential pore collapsing selectively collapses the pores in the skin or top layer of the membrane, but not throughout the bulk porous section of the membrane; thus, creating a top-skin separation layer containing a selected, collapsed pore size. Differential pore collapsing is achieved by treating the porous membrane with a nonsolvent and a swelling agent or a nonsolvent and solvent, where the nonsolvent is more volatile than the swelling agent or the solvent, and then drying the membrane; that is, permitting evaporation, to achieve the desired pore collapsing. Though not wishing to be bound by any particular theory of method and operation, other than the use of a chemical treatment to provide for differential pore collapsing, it is believed that, when the porous, dry membrane is treated by the posttreatment solution, the volatile nonsolvent in the drying step escapes preferentially, and, therefore, the swelling agent or the solvent tends to concentrate temporarily in the top-skin layer, possibly due to surface tension and plasticization effects, which leads to a significant pore collapse, but in a controlled manner, of the large-size pores of the membrane to pores of significantly smaller size; that is, at least and sometimes one or two orders of magnitude or smaller. Generally, for example, the pores may collapse from the range of 50 to 250 Angstroms to 10 Angstroms or less; for example, 0.1 to 5 Angstroms; for example, 2 to 5 Angstroms.

The invention comprises producing a high-flux, asymmetric, open-cell, porous polymer membrane, for example, of cellulose acetate, and converting the dry asymmetric membrane into a membrane of tighter or more selective properties, such as a dry, gas-permeation or a reverse-osmosis membrane, by collapsing differentially the pores in the skin layer, but not the underlying, integral, bulk layer, to form a thin-skin separation layer of desired selectivity and substantially lower pore size. The porous, uncollapsed layer is basically a nonbarrier, supporting substrate of the membrane. The dry asymmetric membrane is treated with a treating solution and then dried, to provide the desired degree of skin pore collapse. The asymmetric membrane is contacted typically by sealing or immersing the membrane in the treating solution generally under ambient-temperature conditions of 60° F. to 80° F. The treated membrane is then placed under one-sided constraint; for example, on a nonporous surface, and on the bulk membrane side opposite the top skin layer, so that evaporation of the treating solution occurs only or substantially through the top skin layer. One-sided constraint may be accomplished, by placing a film of the treated membrane or treating the membrane while in a nonporous substrate, such as on glass or metal sheet, or a solid, polymeric, substrate layer. In operation, drying of the treated membrane may occur through evaporation of the components of the treating solution, or which drying and evaporating may be hastened by gentle heating (that is, not heat-annealing) of the treated membrane; for example, at temperatures of generally 140° F. or less; for example, 90° F. to 125° F., but insufficient to heat-anneal or to change substantially the pore structure by such heating. On drying, the more volatile nonsolvent in the treating solution escapes first, and the concentration of the swelling agent/solvent, such as a residual or added solvent, is then preferentially concentrated in the top skin layer, to produce a pore-collapsed, thin, separation layer.

The treating solution employed comprises a volatile nonsolvent, preferably a volatile organic nonsolvent, for the polymer of the membrane, and, with a cellulose-ester-type membrane, may comprise a volatile hydrocarbon, for example, having a boiling point above about 95° F.; for example, 95° F. to 120° F. or more, such as a $C_5$-$C_8$ hydrocarbon, such as toluene, heptane, hexane, etc. The selection of the nonsolvent is based on its nonsolubility for the polymer and the degree of volatility and miscibility with the selected polymer solvent or swelling agent.

The treating solution also includes a minor amount of a swelling agent or a solvent for the polymer of the membrane. Typically, the amount of the solvent is quite low, generally less than 5% by volume, and typically 0.1% to 2%, such as 0.1% to 1%. The amount of swelling agent should be sufficient to swell the pores of the skin layer, when the swelling agent is concentrated in the skin layer on evaporation of the nonsolvent, so as to effect the desired degree of pore collapse. The amount of the solvent should be sufficient to solubilize or plasticize the polymer of the skin layer, when concentrated in the skin layer, on evaporation of the nonsolvent, to effect the desired degree of pore collapse. The swelling agent/solvent should be miscible or soluble in the nonsolvent and preferably be less volatile, but easily evaporated at ambient temperatures with the nonsolvent; for example, a boiling point of 100° F. or more; for example, 125° F. The solvent of the treating solution may comprise a strong solvent for the polymer of the membrane and, for example, where the polymer is a cellulose ester, such as cellulose acetate, may comprise a polar solvent, such as an alicyclic, five-to-six-member, nitrogen-containing compound; for example, an amide; for example, a formamide like dimethyl formamide (DMF), an acetamide like dimethyl acetamide (DMAC), an oxygen-containing solvent like esters, ethers and ketones like acetone, methylethyl ketone, dioxane, and other strong polar solvents. The swelling agent comprises an agent which, in contact with the polymer of the membrane, causes a swelling of the membrane polymer, and thus leads to a reduction in pore size. The selection of the swelling agent is based on the particular polymer of the membrane. With cellulose-ester-type membranes, the swelling agent may comprise an oxygen-containing, aliphatic agent hydroxyl-containing agent, such as a glycol, and particularly water. If desired, the treating solution may comprise a nonsolvent like heptane and a solvent like NMP or a combination of hexane and NMP.

If desired, the solvent may comprise small amounts of residual solvent from the casting solution, which is retained in the high-flux membrane by incomplete leaching or washing of the membrane, rather than solvent which is added to the treating solution. If incomplete washing of the cast membrane occurs, small amounts of the usually higher-boiling-point solvent remain in the membrane; for example, 0.05% to 1% by weight, which residual solvent may be used as the solvent alone or in combination with added solvents of the treating solution. Where residual solvents are retained, then with time such residual solvents tend to densify the top skin layer and change the pore size. Thus, where residual solvents, such as dioxane in cellulose-acetate casting solutions, remain in the incompletely washed membrane, with heptane as the nonsolvent, the posttreatment should occur shortly after the incomplete washing, since, on delay of 2 or more days, the residual solvent will densify the top skin layer and be reduced in amount.

The invention will be illustrated with the use of cellulose-acetate-type membranes; however, the invention may employ other cellulose-ester-type membranes or membranes of other polymeric material, such as polysulfone like alkyl polysulfone, fluorocarbon polymers like polyvinylidene fluoride polymers, polyamides, polyolefins and other polymeric material used or useful for membrane separation. The asymmetric separation membrane used as the starting membrane is characterized at least by one top skin layer having pores of generally less than 1000 Angstroms; for example, 100 to 250 Angstroms, with an underlying porous layer, while the desired membrane is to have a pore collapse of greater than 50 or about 100 Angstroms, such as to have collapsed pores of less than about 10 Angstroms.

In order to provide for selective differential pore collapsing of the pores of the top skin layer, it is desirable to direct the evaporation or the drying process through the top skin layer which is to be collapsed. After treatment, the treated membrane preferentially is constrained on one side, to direct solvent evaporation through the top skin layer, such as by placing or supporting the treated membrane on an underlying, nonporous support layer. The membrane may comprise a composite-type membrane with a bonded supporting structure, such as a fabric layer like a woven or nonwoven fibrous layer, such as cotton or nylon sail cloth, wherein the membrane is cast onto or bonded to the support layer, and the skin layer is formed by evaporation and then leaching.

If desired, the posttreating solution may contain very minor amounts of other agents and additives as desired, to control evaporation rates, or diluents for cost and economical purposes, to plasticize the membrane polymer and to effect otherwise the chemical treatment and to stabilize or impart desirable properties to the resulting membrane. In particular, it has been found that the addition of small amounts of polymeric agents to the treating solution is desirable, to control more carefully and to retard the differential pore-collapsing process. For example, it has been discovered that small amounts of polymers or agents, which control or retard the evaporating or drying rate and permit more uniform pore collapsing, are useful. Such polymer agents are often employed in amounts of less than about 5% by weight of the treating solution, and generally from 0.01% to 1% by weight. In the treating of cellulose-acetate membranes, the use of silicone and urethane polymers has been found to control the collapse of the pores, and particularly silicone prepolymers, with free OH reaction groups, and urethane prepolymers; that is, having free NCO groups, which react with the hydroxyl groups of the cellulose acetate or retained water.

The polymer agents employed in the posttreatment solution may vary in nature and kind, but typically, where high flux is desired, are organic polymers having a molecular weight of about 100,000 or less, or having a polymer structure which permits the polymer to enter and coat the internal surface of the pores of the top skin coat. Generally, prepolymer polymers are used having functional terminal groups, and which prepolymers are then cross-linked in situ in the skin layer. Polymers and prepolymers, which provide enhanced chemical resistance and better mechanical properties to the skin layer, are most desired, such as silicone polymers and urethane polymers; however, other natural or synthetic polymers may be used. One preferred silicone polymer comprises an organo polysiloxane, such as a polydimethyl siloxane, having an OH terminal group; that is, a silicone silanol polymer. The prepolymers have terminal functional groups, to permit further cross-linking of the prepolymers, such as halide groups like chloride, hydroxy groups, alkoxy groups, such as $C_1$–$C_4$ alkoxy groups like methoxy and ethoxy, isocyanate groups, alkyl groups, such as $C_2$–$C_4$ alkyl like methyl, phenyl groups, vinyl groups, and substituted amine groups, such as monoalkyl and dialkyl groups, such as tertiary alkylamino groups like dimethylamino groups.

The cross-linking of the prepolymers is carried out, with the curing generally activated by water, such as atmospheric moisture, and at room or ambient temperatures, and in the presence of a selected cross-linking agent having the desired terminal functional group. The amount of the cross-linking agent may vary as desired; however, such agents are often employed in amounts of about 1% to 25% by weight of the prepolymer; for example, 5% to 15%. The polysiloxane polymers, such as silicone oils, are cross-linked generally at room temperature in the presence of a catalyst and a functional cross-linking agent. One class of cross-linking agents for polydimethyl siloxane silanols includes vinyl silicone and alkoxy-substituted vinyl silicone with substituted oxime groups, such as terminal O—N=C groups, with methyl and ethyl or other alkyl groups on the carbon atom. A general structural formula comprises:

wherein $R_1$ is hydrogen, an alkyl radical like methyl or an alkoxy radical like methoxy; and $R_2$ and $R_3$ are hydrogen or $C_1$–$C_4$ alkyl radicals, such as methyl and ethyl, and n is an integer of one, two or three.

Another suitable cross-linking agent comprises a methyl silicone with a secondary amine group, such as wherein R is an alkyl group, such as methyl, and, wherein n is an integer of one, two or three.

The prepolymer and cross-linking agent cross-link the prepolymer siloxane in the presence of a small amount of a catalyst, such as 0.001% to 0.1% by weight; for example, 0.005% to 0.05%. The catalyst may be a metal catalyst and generally is a multivalent metal catalyst, such as a urethane catalyst like a tin catalyst. The catalyst is generally introduced as an organometal salt, such as containing fatty-acid groups. One suitable catalyst comprises an alkyl fatty-acid metal catalyst, such as a di $C_1$–$C_4$ alkyl difatty-acid tin like dibutyl tin dilaurate.

In one preferred embodiment, the prepolymer is a polydimethyl siloxane silanol having a molecular weight of less than 80,000, and about 0.5% to 1% by weight dissolved in heptane with a substituted NCO silane cross-linking agent (for example, PSX311 of Petrarch Systems, Inc.) in the presence of a tin catalyst, to provide a DPC membrane having an SF of about 20 to 30 and a gas-permeation rate $(P/l)_{CO_2}$ of 2 to The treated, dried, asymmetric membrane produced by the process generally is a dry membrane particularly suitable for use as a gas membrane or as a reverse-osmosis membrane of good selectivity, and is characterized by a thin skin layer of up to 1000 Angstroms in thickness on an integral, bulk porous layer, with the collapsed pores averaging generally less than 10 Angstroms.

The invention will be described for the purpose of illustration only in connection with certain embodiments; however, it is recognized that various changes, modifications and improvements may be made by those persons skilled in the art, all falling within the spirit and scope of the invention.

DESCRIPTION OF THE EMBODIMENTS

Figure 1:
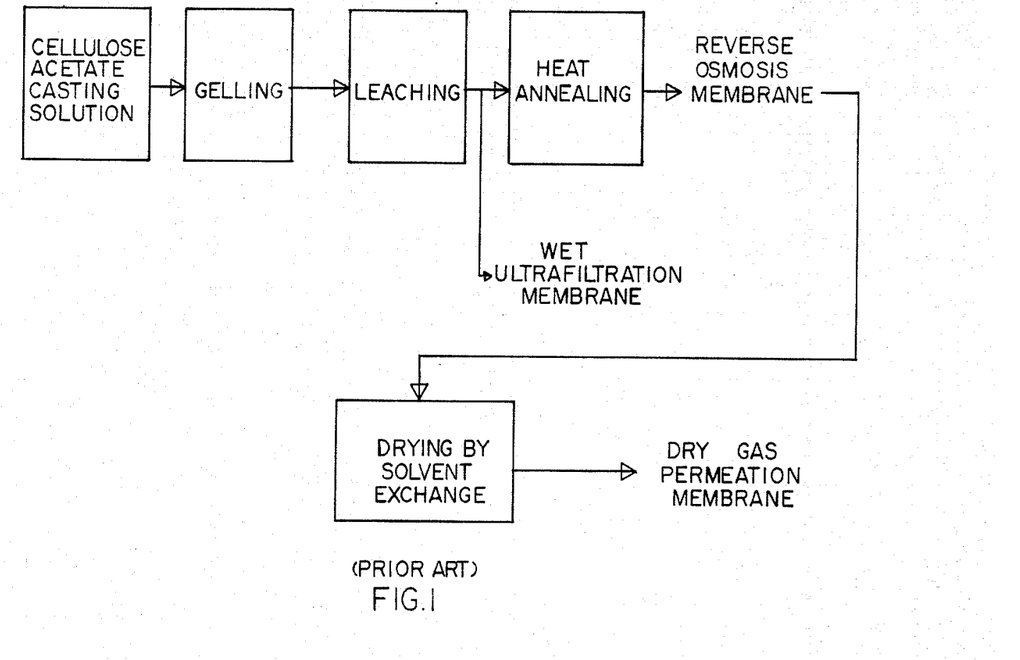
FIG. 1 is a general schematic block diagram of the sequence of prior-art process steps for the preparation of cellulose-acetate separation membranes.

FIG. 1 illustrates the general process steps of preparing various separation membranes of the prior art. Typically, a cellulose-acetate solvent solution is cast as a thin film onto a support, and the solvent; for example, acetone, dioxane, etc., is permitted to evaporate partially to provide a gelled film, which is then immersed in a water bath to leach out remaining solvent. The wet membrane prepared has a thin, top skin layer and an integral, porous substrate with large skin pores which makes the recovered wet membrane suitable for use as an ultrafiltration membrane for the separation of large molecules in a solution at low pressure; for example, under 200 psi. After leaching, the membrane may be heat-annealed to tighten and reduce the skin pores, to prepare an annealed membrane suitable for use as a reverse-osmosis membrane for the separation of low-molecular-weight salt from a solution at high pressure; for example, over 800 psi. The reverse-osmosis membrane can be converted to a gas-permeation membrane, by drying the membrane using a two-step, solvent-exchange drying process. The solvent-exchange process employs a first agent, such as isopropanol, miscible with water, to remove the water from the membrane, and then a second, more volatile agent miscible with the first agent, such as heptane, to remove the alcohol and, on evaporation of the heptane, to produce an essentially dry membrane having a tight skin layer for use as a gas-permeation membrane.

Figure 2:
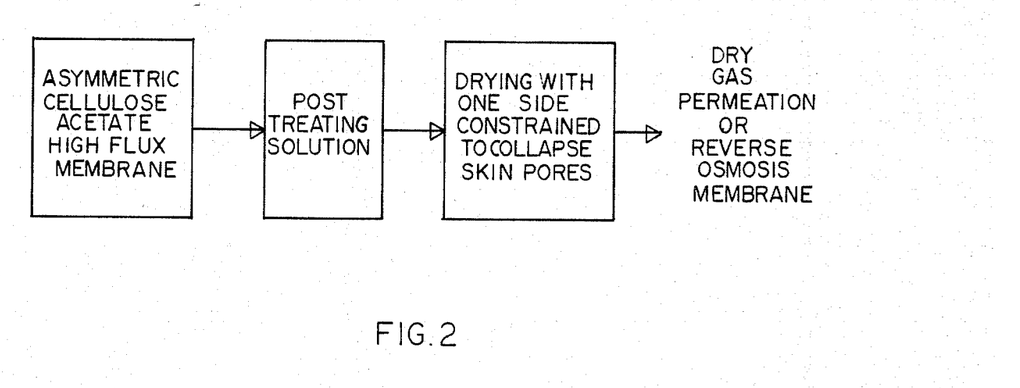
FIG. 2 is a general schematic block diagram of the sequence of process steps for the preparation of a differential pore-collapsed separation membrane of the invention.

FIG. 2 illustrates the process of the invention, wherein a high-flux; that is, an asymmetric, membrane, having large skin pores; for example, about 100 Angstroms or more, is converted to a dry, porous membrane with small skin pores, by collapsing differentially only the skin pores, to reduce such skin pores by chemical annealing to about 10 Angstroms or less. In the process, the high-flux membrane is soaked in a posttreating solution; for example, heptane, and 0.1% to 2% by volume of NMP, and then the soaked membrane is permitted to dry by evaporation; for example, at 60° F. to 80° F., while constraining evaporation from the opposite side of the skin layer, by placing the treated membrane film on a solid substrate. After evaporation of the treating solution, the dry DPC membrane is suitable for use as a reverse-osmosis membrane or a gas-permeation membrane.

EXAMPLE 1

A cellulose-acetate membrane film was prepared and the gas permeability rate (P/l P=permeation, l=thickness of skin layer) and separation factor (SF) compared for unannealed and heat-annealed membranes, with the results set forth in Table I.

TABLE 1

| Annealed vs. Unannealed (One-sided Constraint Drying) | | | |
|---|---|---|---|
| System | Annealing Conditions | $(P/L)_{CO_2}^{(ft/d\text{-}psi)}$ | $SF(CO_2/CH_4)$ |
| Unannealed | — | 2–3 | 5–10 |
| Annealed | 95° C./30 minutes | 1.5 | 10–18 |

The unannealed high-flux membrane would represent a typical ultrafiltration (UF) membrane, while the heat-annealed membrane would represent a reverse-osmosis (RO) membrane. As shown, the heat-annealed RO membrane had a lower permeation rate, but a greater SF for the separation of $CO_2/CH_4$.

EXAMPLE 2

An unannealed cellulose-acetate membrane was prepared and dried, One-sided constrained drying on a glass plate was compared with two-side unconstrained drying with the results set forth in Table II.

TABLE II

| One-sided Drying vs. Two-sided Drying | | | |
|---|---|---|---|
| System | Drying | $(P/L)_{CO_2}^{(ft/d\text{-}psi)}$ | $SF(CO_2/CH_4)$ |
| Unannealed CA | one-sided | 2–3 | 5–10 |
| Unannealed CA | two-sided | 1.5–2.0 | 5–10 |

The results show that one-sided constraint drying provides a higher permeation rate, while constraint on both surfaces of the membrane (the open, bottom, porous substrate and the top skin layer) reduces the permeation rate, with the SF remaining the same.

EXAMPLE 3

A cellulose-acetate (CA) membrane was dried employing a one- and a two-step solvent-exchange process, with the one-step mixture being 85/15 heptane and isopropanol, while the two-step process employed first isopropanol and then heptane, to obtain a dry membrane. The gas-permeation rate and the SF of the membrane so dried are shown in Table III.

TABLE III

| One-step Solvent Exchange vs. Two-step Solvent Exchange | | | |
|---|---|---|---|
| System | Solvent Exchange | $(P/L)_{CO_2}^{(ft/d\text{-}psi)}$ | $SF(CO_2/CH_4)$ |
| 1. Annealed | one-step | 1.5–2.0 | 15–20 |
| 2. Annealed | two-step | 1.5–2.0 | 10–20 |
| 3. Unannealed | one-step | 1.8 | 15–20 |
| 4. Unannealed | two-step | 2–3 | 5–10 |

Experiments 1 and 2, with the heat-annealed CA membranes, represent prior-art processes and prior-art gas membranes, and show generally comparable permeation rates and SF; however, the membranes of Experiments 3 and 4; that is, the high-flux, unannealed membranes treated in either a one- or two-step solvent exchange, provide gas membranes having good gas-permeable rates of 1.8 or greater and a good SF of 5 or more. As shown, the one-step solvent-exchange Experiment 3 provided a gas membrane with a high SF, but low gas permeability, while the preferred two-step process provided, to obtain a dry asymmetric membrane, a high permeation rate and a lower SF.

EXAMPLE 4

A cellulose-acetate membrane was prepared and subjected to solvent exchange drying to test for the effect of residual solvent from the casting solution remaining in the membrane. The results of the water washing or leaching studies are set forth in Table IV.

TABLE IV

| H$_2$O Washing Studies, a Residual Solvent Effect | | | |
|---|---|---|---|
| System | Washing Time | (P/L)$_{CO_2}^{(ft/d-psi)}$ | SF(CO$_2$/CH$_4$) |
| Unannealed | 0 | 1.9 | 13 |
| CA | 1 day | 2.4 | 7–8 |
| CA | 4 days | 2.6 | 6 |
| CA | 8 days | 2.9 | 6 |

In order to provide an acceptable, starting dry membrane for the process of preparing a differential pore-collapsed (DPC) membrane, the starting membrane must be washed or leached with water to remove residual solvents. As illustrated by the results, with the presence of residual solvent, the top skin layer densifies and the SF increases. The starting membrane for the DPC process should be leached after gelling, to remove residual solvents (unless the residual solvent is to be left and the posttreatment is carried out shortly thereafter) and to obtain a high-flux membrane with an SF for the gas, for example, of less than 10.

EXAMPLE 5

An unannealed, high-flux CA membrane was posttreated with a heptane solution, with a residual solvent of less than about 0.5%, such as dioxane, in the CA membrane, with the results shown in Table V.

TABLE V

| Heptane Posttreatment on Porous CA membrane (One-sided Constraint Drying) | | | |
|---|---|---|---|
| System | Posttreatment With Heptane | (P/L)$_{CO_2}^{(ft/d-psi)}$ | SF(CO$_2$/CH$_4$) |
| Unannealed Membrane | yes | 2.3 | 14 |
| Unannealed Membrane | no | 2.86 | 6.6 |

EXAMPLE 6

An annealed CA membrane was posttreated with heptane without constraint air-drying, with the results set forth in Table VI.

TABLE VI

| Heptane Posttreatment on Annealed CA membrane with No Constraint Drying | | | |
|---|---|---|---|
| System | Heptane Posttreatment | (P/L)$_{CO_2}^{(ft/d-psi)}$ | SF(CO$_2$/CH$_4$) |
| Annealed CA | yes | 0.9 | 21 |
| Anneaed CA | no | 1.2 | 16 |

The CA membrane was heat-annealed for 3 minutes at 95° C. The heat-annealed CA membrane, without the posttreatment, is a conventional reverse-osmosis membrane. The results show that a heptane posttreatment (with integral H$_2$O as a swelling agent or residual solvent dioxane in the membrane) of a reverse-osmosis membrane can be used to provide some differential pore collapse of a low-flux RO membrane. The posttreatment of the annealed membrane reduced the gas-permeation rate and increased the SF.

EXAMPLE 7

A gas-permeation membrane, in accordance with the invention, was prepared by first preparing a CA membrane, which is then dried by solvent exchange, to obtain a high-flux, dry CA membrane (pores of the skin layer about 50 to 100+ Angstroms), and the high-flux membrane then posttreated to prepare a gas-permeation membrane.

A cellulose-acetate casting solution is prepared which has the following formulation:

| | Gm | % |
|---|---|---|
| Cellulose triacetate | 387.5 | 7.51 |
| Cellulose diacetate | 387.5 | 7.51 |
| 1,4-dioxane ACS grade | 2325.0 | 45.03 |
| Methanol ACS grade | 350.0 | 6.78 |
| Acetone ACS grade | 1165.0 | 22.57 |
| Maleic acid ACS grade | 235.0 | 4.55 |
| Acetic acid glacial | 312.5 | 6.05 |
| | | 100.0% |

The casting solution is applied to a shrinkable nylon support material at room temperature using a doctor blade at a 10-mil thickness. The membrane is immersed into a 2° C. water bath within 0.3 to 0.5 seconds after casting. The formed membrane is then washed in 2° C. water for 25 minutes to remove excess solvent. The nylon support is a woven fabric 8 mils thick.

Solvent exchange, with one-sided constraint, is carried out to obtain a high-flux, dry, porous membrane. The membrane is immersed in ACS-grade isopropyl alcohol (IPA) at 1° C. to 3° C. for 30 minutes, to remove liquid water, and then is drained of excess IPA and placed in ACS-grade Heptane 1° C. to 3° C. for 30 minutes, to remove the liquid IPA, leaving a moisture-free membrane. The membrane is air-dried, skin side up, with the membrane film held in place to prevent curling and deformation. A dry CA, high-flux asymmetric membrane is obtained having pores of about 50 to 100 Angstroms in the skin layer.

A posttreatment solution is prepared having the formulation as shown in Table VII.

TABLE VII

| Posttreatment solution | % by weight |
|---|---|
| 1. Polydimethylsiloxane silanol (prepolymer) (Glassclad SE, 77000 MW, manufactured by Petrarch Systems Inc.) | 0.90 |
| 2. Methylbis(methylethylketoxime)methoxysilane(cross-linking agent) | 0.09 |
| 3. Dibutyl tin laurate (catalyst) | 0.01 |
| 4. Heptane-volatile nonsolvent for CA | to 100% |
| 5. Solvent (if there is no risidual solvent; that is, doixane in the membrane, 0.1% to 1% NPM or other solvent is added) | — |

The dehydrated membrane is immersed in the posttreatment solution for 30 minutes at room temperature, and the treated membrane is reair-dried, with precautions taken to prevent curling and deforming of the membrane (skin side up) (one-sided constraint drying on a glass or metal solid support). After complete dryness is achieved, the membrane is then ready to be formed into usable format, such as a spiral module, as a gas-permeation membrane.

EXAMPLE 8

The high-flux CA membrane prepared as in Example 7 was washed to remove all residual solvent. If small amounts of residual solvent; for example, less than 0.5%, such as dioxane, are retained in the CA membrane, then the top skin layer will densify with time and the flux (or permeation rate for gases) and percent salt rejection (or SF for gases) will change. If residual solvent is retained, then the residual solvent will act as the solvent in the posttreating, so that no or little solvent need be added to the volatile nonsolvent; for example, heptane, in the posttreatment process, to obtain a DPC membrane. Thus, to obtain a high-flux CA membrane, it is desirable to wash out all or substantially all (where posttreatment will follow shortly) of the residual solvent.

The effects on permeation rate and SF of a CA membrane, by variation in washing time, and temperature in a water bath are illustrated in Table VIII.

TABLE VIII

| Casting Condition | Days In $H_2O$ | $(P/L)_{CO_2}^{(ft/d \cdot psi)}$ | SF |
|---|---|---|---|
| *3°/3° | 1 | 2.5 | 7-8 |
| 3°/11° | 1 | 2.8 | 8-9 |
| 3°/3° | 0 | 1.9 | 13 |
| 3°/3° | 1 | 2.4 | 7-8 |
| 3°/3° | 4 | 2.6 | 6 |
| 3°/3° | 8 | 2.9 | 6 |

*temperature gelation/temperature washing

EXAMPLE 9

Posttreatment of the high-flux CA membrane, with no residual solvent, was carried out, with the results shown in Table IX. The use of posttreatment with a volatile nonsolvent (heptane) and a CA solvent (Experiments 3 to 6 with acetone, N-methyl pyrrolidone, dimethyl formamide, methylethyl ketone) and a volatile nonsolvent (heptane) shows differential pore collapsing which decreases the gas-permeation rate and increases the SF over no posttreatment or heptane-only posttreatment (Experiments 1 and 2). Experiment 7 illustrates the use of two volatile nonsolvents, while Experiment 8 illustrates the use of water as a swelling agent.

TABLE XI

Heptane plus Various Solvent Posttreatment on Asymmetric Porous CA Membrane (No Residual Solvent + One-sided Constraint)

| Posttreatment with | SF | $(P/L)_{CO_2}^{(ft/d \cdot psi)}$ |
|---|---|---|
| 1. None | 6.12 | 2.58 |
| 2. Heptane | 9.54 | 2.08 |
| 3. Heptane + 0.5% acetone | 9.75 | 2.12 |
| 4. Heptane + 0.5% NMP | 21.7 | 1.21-1.5 |
| 5. Heptane + 0.5% DMF | 13.3 | 1.54 |
| 6. Heptane + 0.5% MEK | 10.7 | 2.13 |
| 7. Heptane + 0.5% toluene | 9.66 | 2.08 |
| 8. Heptane + 0.5% $H_2O$ | 10.1 | 2.31 |

EXAMPLE 10

A CA high-flux membrane was prepared and treated with increased amounts of the solvent N-methyl pyrrolidine (NMP) in the posttreating solution and the percent salt rejection and flux rate, as for a reverse-osmosis membrane, determined, with the results shown in Table X. The data indicate that, as the amount of NMP solvent in the posttreatment solution increased even slightly, the degree of differential pore collapse of the pores of the skin layer increased, as shown by the increase in salt rejection of a solution; that is, the decrease of the pore size without any substantial change in the flux rate. The use of the posttreatment process provides for a DPC CA membrane suitable for use as a reverse-osmosis membrane.

TABLE X

Asymmetric CA Membrane One-sided Constraint with Increased Solvent Posttreatment

| Posttreatment with | Salt Rejection (%)[c] | Flux (GFD)[b] |
|---|---|---|
| 1. None | 33.75 | 68 |
| 2. Solvent exchange[a] | 93.8 | 22 |
| 3. Solvent exchange, then 0.1% NMP/Heptane | 95.4 | 17 |
| 4. Solvent exchange, then 0.2% NMP/Heptane | 95.7 | 18 |
| 5. Solvent exchange, then 0.5% NMP/Heptane | 96.1 | 17 |

[a]Solvent exchane to dry membrane: isopropanol firststep at 2° C., then heptane at 2° C.,
[b]GFD-gallons of flux per day
[c]Salt rejection of sulution at 600 psi, 25° C.

EXAMPLE 11

An unannealed CA high-flux membrane was posttreated with a heptane solution containing various polymers, and the permeation rate and SF were determined as set forth in Table XI. The CA membrane was prepared from a 50% tricellulose-acetate/50% dicellulose-acetate solution of acetone and dioxane, with the gelled CA membrane not thoroughly washed to contain a small amount (less than 0.3%) of dioxane. The solvent-exchange, dry CA membrane was then posttreated with a heptane solution (with the residual solvent in the CA membrane then constituting a nonsolvent/solvent post-treatment solution) containing various film-forming polymers as shown. The use of the polymers, particularly the silicone OH or a water-reacting prepolymer (Experiment 1) maintained the high flux of the CA membrane (the CA mixture results in lower permeability than the cellulose-triacetate membrane), without significant change in the SF and providing better mechanical properties to the resulting DPC membrane. The use of the polymers prevents and contols unnecessary pore collapsing and amplifies the effects of differential pore collapse, and results in high flux for the faster gases.

TABLE XI

Unannealed CA membrane[1] Posttreated with Heptane Containing Poylmers

| Polymer Agent in Heptane | $(P/L)_{CO_2}^{(ft/d \cdot psi)}$ | $SF(CO_2/CH_4)$ |
|---|---|---|
| 1. 1% silicone prepolymer SE[2] Glassclad | 3.0 | 25 |
| 2. 1% silicone polymer[3] Sylgard 182 | 2.0 | 26 |
| 3. 1% silicone polymer Sylgard 184 | 2.0 | 21 |
| 4. 1% silicone polymer Sylgard 186 | 2.0 | 24 |
| 5. 1% isocyanate prepolymer Conathane EN-7[4] | 0.5 | 30 |

[1]CA membrane cast from CA-acetone-dioxane casting solution and not completely washed, so that small amount of dioxane remains as residual solvent.
[2]a silione silanol prepolymer of Petrarch Systems, Inc.
[3]a polymethyl siloxane polymer of Dow-Corning Corporation
[4]a urethane prepolymer with free NCO groups from Conap, Inc.

EXAMPLE 12

The use of polymers in the posttreatment solution has been shown to improve chemical and humidity resistance of the DPC membrane and to increase aging and the stability of the membrane, as shown by the data of Table XII.

TABLE XII

Humidity Resistance Studies

| System | Initial $(P/L)_{CO2}^{(ft/d\text{-}psi)}$ | Initial $SF(CO_2/CH_4)$ | 1-Day 55% RH, 25° C. Exp $(P/L)_{CO2}^{(ft/d\text{-}psi)}$ | 1-Day 55% RH, 25° C. Exp $SF(CO_2/CH_4)$ |
|---|---|---|---|---|
| 1. Annealed CA membrane | 1.78 | 13.1 | 1.0 | 16.2 |
| 2. Unannealed CA membrane | 2.3 | 10.0 | 1.9 | 8.0 |
| 3. Annealed CA membrane treated with 1% SE silicone | 1.4 | 16–20 | 1.4 | 23.0 |
| 4. Unannealed CA membrane treated with 1% SE silicone | 1.45 | 18.4 | 1.6 | 26.0 |

The data establish that the use of the reactive silicone polymer as an agent in the posttreatment solution results in improved humidity resistance of the DPC membrane. The CA membrane tends to absorb water and to swell; thus changing the permeation rate and SF. The use of silicone SE as illustrated, both with heat-annealed and unannealed posttreated membranes (Experiments 3 and 4) prepared as in Example 12, results in a stable gas-permeation rate, while heptane posttreated annealed and unannealed membranes (Experiments 1 and 2) show changes in permeation rate and SF with time; that is, humidity and aging.

EXAMPLE 13

It has been discovered that, to prepare a high-flux CA membrane suitable for use in the DPC process, the amount of water in the first step of the solvent-exchange process should be limited to about 8% by volume or less; for example, 0% to 5%. The effect of water in the water-miscible alcohol; for example, isopropanol, tends to reduce the permeation rate and increase the SF of the membrane. The effect of water in isopropanol (IPA) during IPA/H$_2$O solvent exchange, followed by heptane as the second step of the solvent-exchange process, is shown in Table XIII.

TABLE XIII

| % H$_2$O | $(P/L)_{CO2}^{(ft/d\text{-}psi)}$ | SF |
|---|---|---|
| 0 | 2.67 | 7.75 |
| 5 | 2.6 | 8.4 |
| 10 | 1.7 | 18.5 |
| 15 | 1.8 | 20.5 |
| 20 | 1.8 | 20.41 |

EXAMPLE 14

It has been found that the presence of a residual solvent from the casting solution or solvent exchange; for example, 1% by weight or less, such as 0.1% to 0.5%, is required in the CA membrane, if the posttreatment solvent (heptane) does not contain a solvent, as shown by the results in Table XIV.

TABLE XIV

| Residual solvent | Posttreated with | SF | $(P/L)_{CO2}^{(ft/d\text{-}psi)}$ |
|---|---|---|---|
| Dioxane-0.5% or less | heptane | 15–17 | 1.5–2.0 |
| None | heptane | 10 | 2.5 |

EXAMPLE 15

Some residual solvent in the membrane is required, if the posttreatment process employs only a volatile nonsolvent, such as heptane. In addition, the use of a low-molecular-weight polymer coating agent in the nonsolvent/solvent posttreatment solution is desirable, as shown by the results of Table XV.

TABLE XV

| Residual Solvent | Posttreatment | $(P/L)_{CO2}^{(ft/d\text{-}psi)}$ | SF |
|---|---|---|---|
| 1% or less | heptane | 1.5–2.0 | 15–17 |
| None | heptane | 2.5 | 10 |
| 1% or less | heptane-1% silicone prepolymer (Mw = 26,000) | 2.0 | 21 |
| None | heptane-1% silicone prepolymer (MW = 26,000) | 2.1 | 12 |
| 1% or less | heptane- +0.1% polyurethane prepolymer | 1.0 | 26 |

EXAMPLE 16

It has been discovered that the polymer agent used should have a molecular weight generally about 100,000 or less, such as 80,000, since, if the molecular weight of the polymer is too high, the polymer does not penetrate the pores of the top skin layer. It is advantageous to employ a polymer agent in the posttreatment solution which coats, but does not plug, the internal pores of the top skin layer, to impart better structure and mechanical properties to the DPC membrane. The effect on permeation rates and SF on CA DPC membranes of a silicone prepolymer, having terminal OH groups, but not cross-linked, such as Glassclad SE, is illustrated in Table XVI.

TABLE XVI

| Mw | $(P/L)_{CO2}^{(ft/d\text{-}psi)}$ | SF |
|---|---|---|
| 1,700 | 2.7–2.8 | 10–12 |
| 4,200 | 2.7–2.9 | 12 |
| 26,000 | 2.6 | 10–12 |

TABLE XVI-continued

| Mw | $(P/L)_{CO_2}^{(l/d\text{-}psi)}$ | SF |
|---|---|---|
| 330,000 | 2.1 | 20 |

Low-molecular-weight prepolymers provide high flux and permeation rates, while high-molecular-weight prepolymers increase SF.

EXAMPLE 17

Achieving high flux and high SF is obtained by using a low-molecular-weight silicone prepolymer and suitable cross-linking agents.

TABLE XVII

| System | SF | $(P/l)_{CO_2}$ (ft/d-psi) |
|---|---|---|
| Heptane | 11.7 | 1.78 |
| Cross-linking agents[1] | | |
| CHASE | 25.27 | 1.55 |
| VTO | 23.31 | 1.8 |
| PSX311 | 23.31 | 2.1 |

CHASE: MeSi(NH—S—)₃

VTO: C=C—Si(O—N=C(CH₃)(CH₃))₃

PSX311: C=C—Si(O—N=C(OCH₃)(CH₃))₂ (C₂H₅)

[1] manufactured by Petrarch Systems, Inc.

EXAMPLE 18

Prepolymer terminal functional groups show high flux for prepolymers containing:

—OH and —N(CH₃)(CH₃) groups as illustrated in Table XVIII.

TABLE XVIII

| Terminal Functional Group | $(P/l)_{CO_2}$ | SF |
|---|---|---|
| OH | 2.0 | 15–10 |
| —N(CH₃)(CH₃) | 2.0 | 20 |
| —OCH₃ | 1.8 | 17–18 |
| —Cl | 1.6 | 17 |

All prepolymer Mw=about 500, 1% in heptane, prepolymer cross-linked with cross-linking agent.

EXAMPLE 19

Alternative polymer agents include other polymers having terminal OH or free NCO groups, such as, for example, polybutadiene having OH groups therein, although OH terminal silicone prepolymers are the preferred agents for high-flux DPC membranes. Table XIX compares the permeation rate and SF of CA DPC membranes using polybutadiene and a urethane prepolymer as an agent.

TABLE XIX

| System | % | $(P/l)_{CO_2}$ (ft/d-psi) | SF |
|---|---|---|---|
| Polybutadiene | 0.1 | 1.5 | 22 |
| Polyurethane prepolymers | 0.1 | 1.6 | 27 |

NOTE: Polybutadiene $\xrightarrow{OCNRNCO}$ Polyurethane

EXAMPLE 20

The use of reactive polymer agents in combination has been found useful, particularly where one prepolymer has free NCO groups and the other prepolymer a reactive OH group. The enhanced effects of a combination of silicone prepolymers (OH) with a urethane prepolymer (NCO) are shown in Table XX.

TABLE XX

| System | $(P/L)_{CO_2}^{(l/d\text{-}psi)}$ | SF |
|---|---|---|
| Polyurethane (0.1%) | 1.6 | 27 |
| Silicone prepolymer (1%) | 2.7–2.9 | 12 |
| Polyurethane (0.1%) + silicone prepolymer (1%) | 2.0 | 22 |

What is claimed is:

1. A process of preparing an asymmetric separation membrane suitable for use as a gas-permeation or reverse-osmosis separation membrane, which process comprises:
    (a) treating a preformed dried leached high-flux, asymmetric, polymeric membrane, having a top skin surface with large pores of about 50 angstroms or more and an underlying bulk porous layer, with a posttreatment solution which comprises a volatile nonsolvent for the polymer of the membrane in the presence of a swelling agent for the polymer or a solvent for the polymer; and
    (b) drying the solution-treated, asymmetric membrane, while the membrane is under one-sided constraint, to provide for the evaoporating of the nonsolvent substantially through the top skin layer and for the differential collapsing of the pores of the top skin surface of the asymmetric membrane to a selected, smaller pore size of about 10 angstroms or less.

2. The process of claim 1 wherein the asymmetric separation membrane comprises a cellulose-acetate membrane.

3. The process of claim 1 which comprises differentially collapsing the small pores of the top skin of the asymmetric membrane, having a pore size of about 100 Angstroms or more, to a desired, smaller, open-pore size of about 0.1 to 10 Angstroms.

4. The process of claim 1 which includes treating the asymmetric membrane with a posttreatment solution comprising a volatile hydrocarbon non-solvent and less than about 5% by volume of a solvent for the polymer.

5. The process of claim 4 wherein the hydrocarbon non-solvent comprises heptane and the solvent is selected from the group consisting of dioxane, N-methyl pyrrolidone, dimethyl formamide and dimethyl acetamide.

6. The process of claim 5 wherein the solvent is present in an amount of from about 0.05% to 2% of the posttreatment solution.

7. The process of claim 1 which includes treating the asymmetric membrane with a posttreatment solution of a volatile hydrocarbon non-solvent and water as a swelling agent in an amount of less than about 5% of the solution.

8. The process of claim 1 wherein the high-flux, asymmetric, polymeric membrane is prepared by drying the membrane in a solvent exchange employing an aliphatic alcohol and a volatile hydrocarbon non-solvent.

9. The process of claim 1 wherein the dried high-flux, asymmetric, polymeric membrane is prepared by drying the membrane in a two-step, solvent-exchange process employing substantially water-free isopropanol as a first drying step and employing a volatile hydrocarbon miscible with the isopropanol as the second drying step.

10. The process of claim 1 which includes immersing the asymmetric membrane in the posttreatment solution and drying the posttreated membrane by evaporation of the posttreatment solution from the membrane, while evaporation through the opposite side of the treated asymmetric membrane is constrained by a nonporous substrate.

11. The process of claim 1 wherein the posttreatment solution contains a small amount of a polymeric agent.

12. The process of claim 11 wherein the polymeric agent comprises a silicone polymer or a urethane prepolymer or polybutadiene.

13. The process of claim 11 wherein the posttreatment solution comprises from about 0.1% to 5% by weight of a cross-linkable polymeric agent, having a molecular weight less than about 100,000, and a small cross-linking amount of a cross-linking agent for the polymer and a catalytic amount of a catalyst for the cross-linking reaction.

14. The process of claim 13 wherein the cross-linkable polymeric agent comprises a polydimethyl siloxane silanol prepolymer.

15. The process of claim 11 wherein the high-flux, asymmetric, polymeric membrane is prepared from a casting solution and contains a small, effective amount of a residual solvent from the casting solution as the solvent, and the high-flux membrane is treated with a volatile hydrocarbon nonsolvent.

16. The process of claim 15 wherein the polymeric membrane comprises a cellulose-acetate membrane which contains a small, effective amount of dioxane as a residual solvent in the membrane, and wherein the volatile hydrocarbon nonsolvent comprises heptane.

17. The process of claim 16 wherein the volatile hydrocarbon nonsolvent includes a small amount of a silicone silanol polymer having a terminal hydroxy group or alkylamino group or a polyurethane having free NCO groups.

18. The process of claim 11 wherein the posttreatment solution includes a small pore-coating amount of a silicone prepolymer, having a molecular weight of less than 100,000, and an OH or $-N(CH_3)_2$ terminal functional group.

19. The process of claim 11 wherein the posttreatment solution includes a small amount of a silicone silanol prepolymer and a cross-linking agent.

20. The process of claim 19 wherein the cross-linking agent comprises a vinyl-silicone oxime compound or a polyurethane prepolymer having free NCO groups.

21. The process of claim 19 which includes recovering a dry separator membrane having a gas-permeation rate of about 1 to 3 and a gas-separation factor, based on $CO_2/CH_4$, of about 10 to 20.

22. The differentially pore-collapsed, asymmetric separation membrane prepared by the process of claim 19.

23. The differentially pore-collapsed, asymmetric separation membrane prepared by the process of claim 11.

24. The process of claim 1 wherein the dried high-flux, asymmetric membrane comprises a heat unannealed dry membrane.

25. The process of claim 1 which includes drying the solution-treated membrane under controlled humidity conditions of greater than about 50% relative humidity.

26. The differentially pore-collapsed, asymmetric separation membrane prepared by the process of claim 1.

27. A reverse-osmosis separation process for the separation of a feed fluid stream by a reverse osmosis separation membrane into a permeate fraction and a nonpermeate fraction, which process employs as the separation membrane the differential pore-collapsed separation membrane of claim 1.

28. A gas permeation separation process for the separation of a feed gas stream by a gas separation membrane into a gas permeate fraction and a gas nonpermeate fraction, which process employes as the gas separation membrane the differential pore-collapsed separation membrane of claim 1.

29. In a process for preparing a cellulose-ester separation membrane, which process comprises:
(a) preparing a casting solution which comprises a solvent and a cellulose-ester polymer;
(b) coating the casting solution to form a wet film of the casting solution;
(c) removing at least part of the solvent of the casting solution, to form a gelled membrane film;
(d) washing the gelled membrane film with water;
(e) removing the water by solvent exchange; and
(f) recovering a dry, high-flux, asymmetric, cellulose-ester, separation membrane having a top-skin surface membrane layer, having pores therein of about 50 Angstroms or more, and an integral, underlying, porous bulk layer, the improvement which comprises
(i) immersing the dry-film, washed high-flux, asymmetric membrane in a treating solution comprising a volatile hydrocarbon nonsolvent for the cellulose ester of the membrane and less than about 1% by volume of a solvent for the cellulose ester in the nonsolvent or present as residual solvent in the high-flux membrane, and
(ii) drying by evaporation the solution-treated, asymmetric membrane, while constraining evaporation of the treating solution from the porous bulk layer, to remove preferentially initially the volatile nonsolvent and to concentrate temporarily the solvent in the top skin surface, so as to cause differential pore collapse of the small pores of the top skin surface of the membrane to a controlled and selected smaller pore size of less than about 10 Angstroms.

30. The process of claim 29 wherein the cellulose ester comprises cellulose acetate.

31. The process of claim 29 wherein the small pore size of the top skin layer of the asymmetric membrane, prior to differential pore collapse, averages about 50 to 250 Angstroms.

32. The process of claim 29 wherein the differential pore-collapsed asymmetric membrane has a pore size ranging from less than about 0.1 to 10 Angstroms.

33. The process of claim 29 wherein the nonsolvent comprises heptane and the solvent comprises from about 0.05% to 2% by volume N-methyl pyrrolidone.

34. The process of claim 33 wherein the volatile hydrocarbon comprises heptane and the residual solvent comprises dioxane.

35. The process of claim 29 wherein the treating solution includes a small pore-coating amount of a silicone silanol prepolymer agent and a functional cross-linking agent in the treating solution.

36. The process of claim 35 wherein the small amount of the agent comprises an amount generally less than about 2% by weight of the treating solution, and the agent comprises a polydimethyl siloxane silanol prepolymer having a molecular weight less than about 100,000, and the cross-linking agent comprises an isocyanate-containing agent.

37. The differential, pore-collapsed asymmetric membrane prepared by the process of claim 29.

38. A process of separating a gas feed stream employing a gas separation membrane into a gas permeate fraction and a gas nonpermeate fraction, which process comprises employing the differential pore-collapsed, dry asymmetric separation membrane of claim 29 as the gas-separation membrane.

39. A process of separating a liquid feed stream into a permeate fraction and a nonpermeate fraction in a reverse osmosis process employing a reverse osmosis membrane, which process comprises employing as the reverse osmosis membrane the differential pore-collapsed dry asymmetric membrane of claim 29.

40. The process of separating a gas feed stream comprising carbon dioxide and methane employing a gas separation membrane into a carbon dioxide-enriched permeate fraction and into a methane-enriched nonpermeate fraction, which process comprises employing as the gas separation membrane the differential, pore-collapsed separation membrane of claim 29.

* * * * *